June 29, 1965 L. M. BOURGEOIS 3,191,362
ELECTROSTATIC AIR PURIFIER
Filed Feb. 5, 1962 3 Sheets-Sheet 1
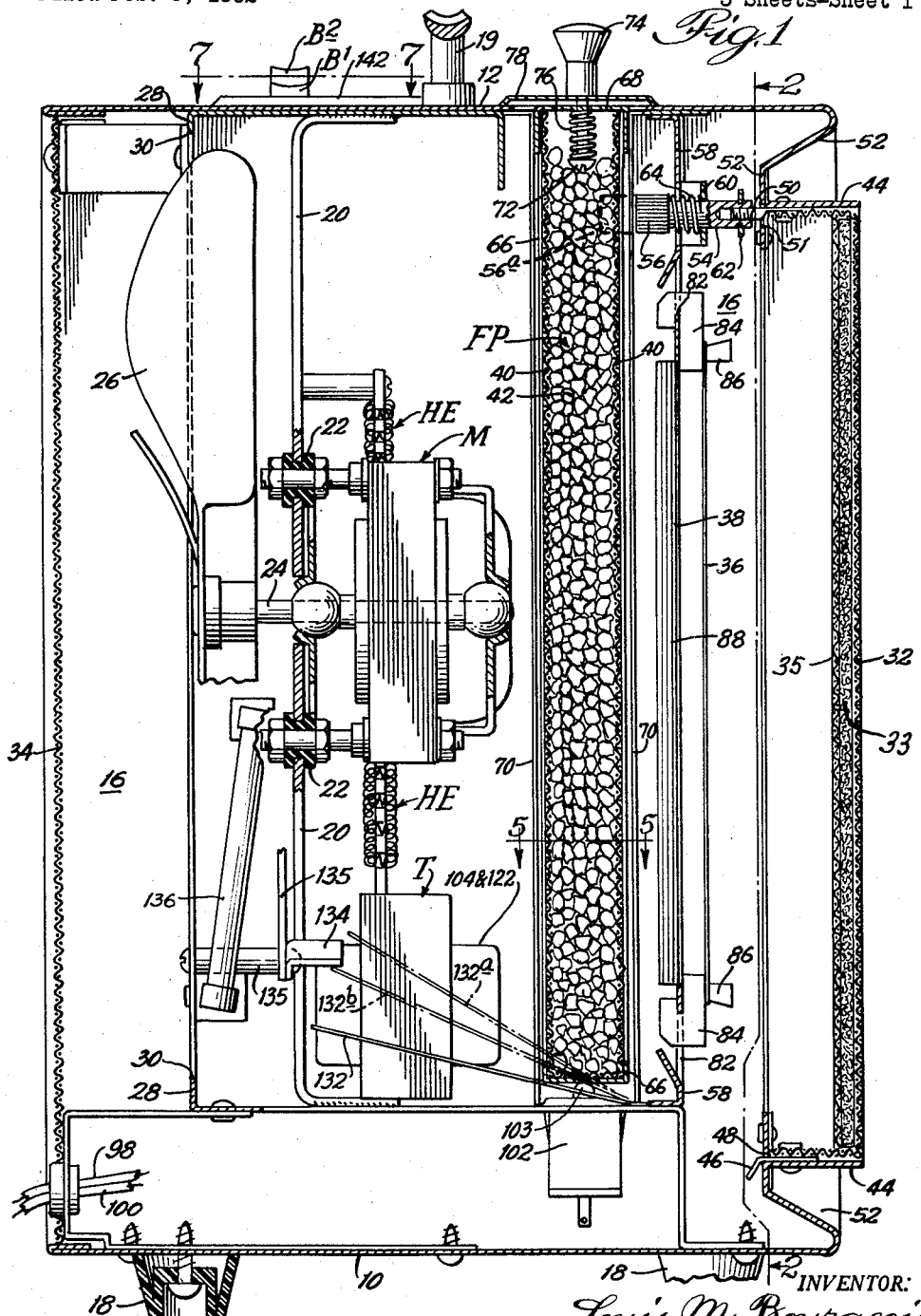
INVENTOR:
Louis M. Bourgeois,
BY
Bair, Freeman & Molinare
ATTORNEYS.

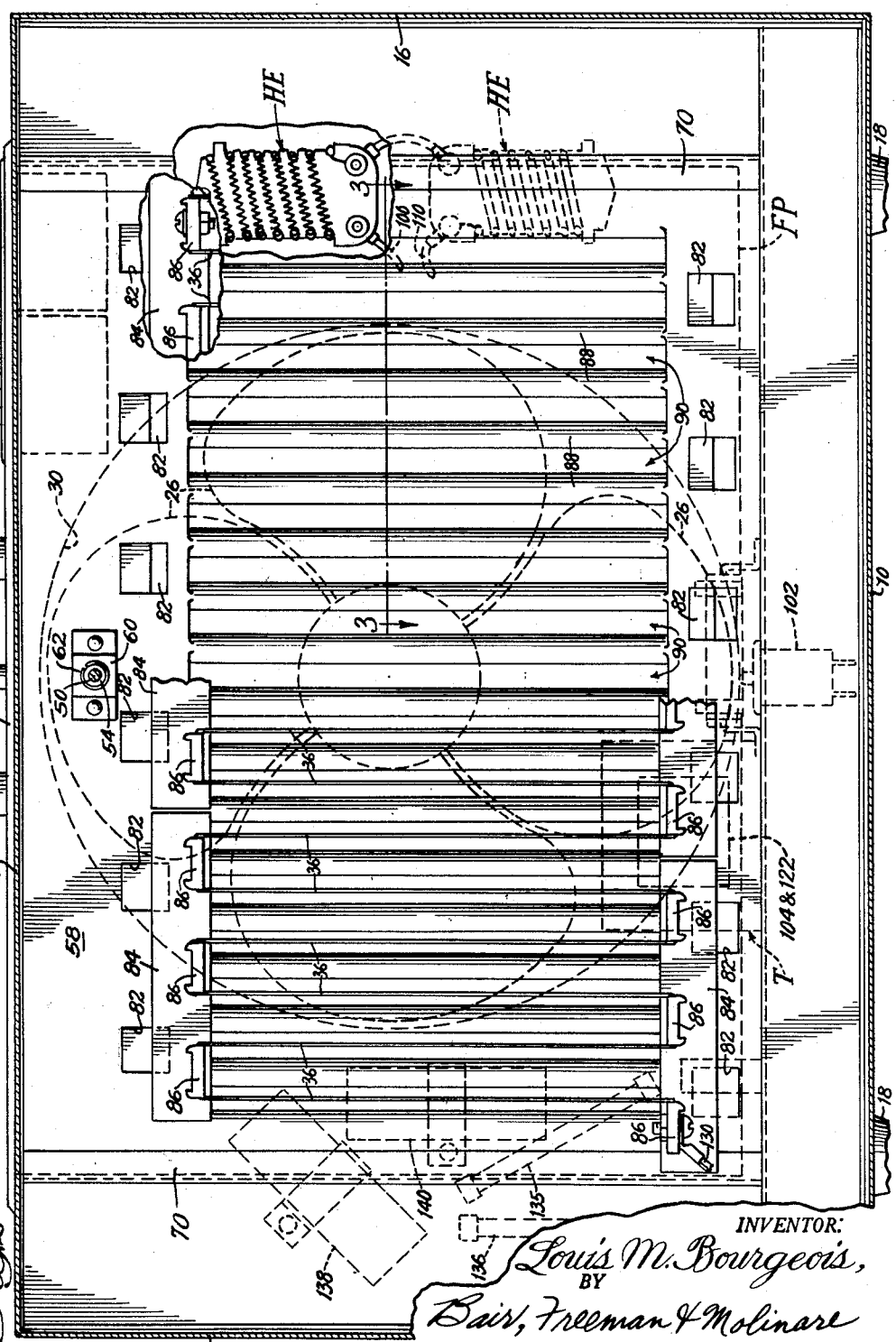

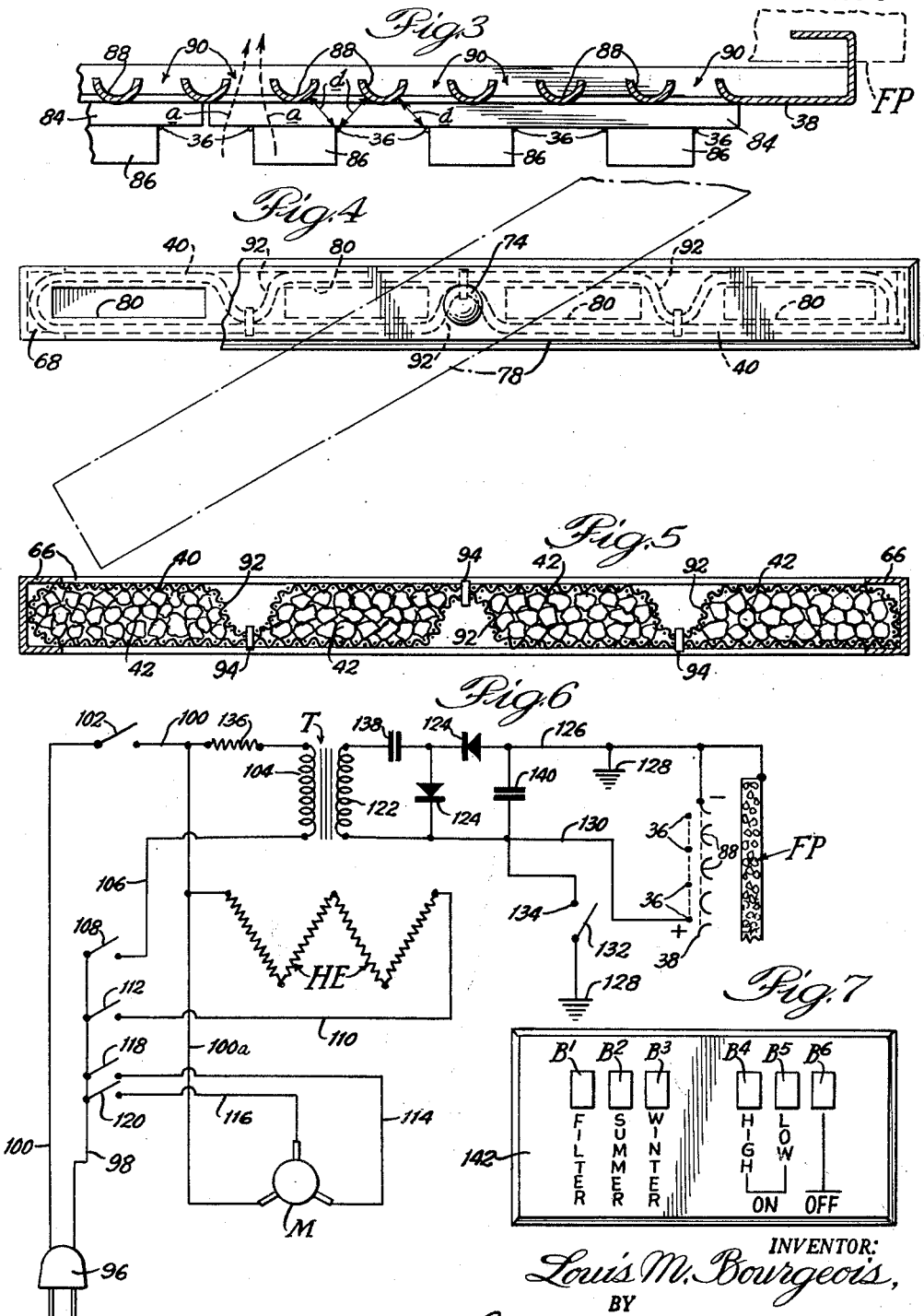

United States Patent Office 3,191,362
Patented June 29, 1965

3,191,362
ELECTROSTATIC AIR PURIFIER
Louis M. Bourgeois, St. Louis, Mo., assignor to Knapp-Monarch Company, St. Louis, Mo., a corporation of Delaware
Filed Feb. 5, 1962, Ser. No. 171,109
8 Claims. (Cl. 55—126)

This invention relates to a unit in the form of an air purifier that utilizes electrostatic means for removing particles of dirt, pollen, smoke and other impurities from an air stream drawn into and discharged from the unit.

One object of the invention is to provide an air purifier unit of this general type which is inexpensive to manufacture and easy to clean.

Another object is to provide an air filter in the unit which utilizes a novel type of ionizing assembly that constitutes an electrostatic precipitator designed for high efficiency in the air filtering operation.

Another object is to provide a further filtering element for filtering both particles and odors from the air passing through the device and being in the form of a filter pack containing an activated material, the construction being such that it may be readily removed from the unit and may be emptied and recharged with fresh activated material.

A further object is to provide interlocking safety features for both grounding the high tension side of a transformer that furnishes current to the electrostatic filter assembly and opening the primary circuit of the transformer when the filter pack is removed for cleaning or replenishing the activated material therein, thus preventing any possibility of shock hazard when the electrostatic filter assembly is exposed upon partial disassembly, and this object contemplates providing an interlock coaction between two parts such that a particular order of reassembly is required to insure a proper safety condition in the unit before the unit is in condition for further operation.

Still a further object is to provide an air filter so designed that all of the air passing therethrough must pass through both the electrostatic filter and the filter pack for maximum air cleaning efficiency.

An additional object is to provide a circuit and control switching arrangement therefor which can be selectively manipulated to cause an air circulator fan to operate selectively with only mechanical air filtering and odor removal, or with the addition of electrostatic precipitator action, and with the further addition of selectively heating the circulated air by the energization of electric heating elements within the housing of the unit.

With these and other objects in view, my invention consists in the construction, arrangement and combination of the various parts of my electrostatic air purifier, whereby the objects above contemplated are attained, or hereinafter more fully set forth, pointed out in my claims and illustrated in detail on the accompanying drawings, wherein:

FIG. 1 is a vertical cross-sectional view through an electrostatic air purifier unit embodying my invention;

FIG. 2 is a fragmentary vertical cross-sectional view taken substantially on the line 2—2 of FIG. 1;

FIG. 3 is a horizontal cross-sectional view showing details of the electrostatic purifier construction, and is taken substantially on the line 3—3 of FIG. 2.

FIG. 4 is a fragmentary plan view of a filter pack used in my air purifier;

FIG. 5 is a cross-sectional view of the filter pack and is taken on the line 5—5 of FIG. 1;

FIG. 6 is an electrodiagrammatic view showing the circuit for various elements of my air purifier; and FIG. 7 is a plan view of a control switch plate for the circuit shown in FIG. 6.

On the accompanying drawings, I have used the reference numeral 10 to indicate the bottom wall, 12 the top wall, and 14 and 16 the end walls of a housing for my air purifier unit. The housing 10-12-14-16 is provided with supporting feet 18. A carrying handle 19 is provided, the device being readily portable so that it can be located conveniently wherever desired.

Completing the housing is an intake grille 32 and an exhaust grille 34. These may be of expanded metal or the like so that as air enters the grille 32 the heavy dust particles impinge the grille and are held thereon due to its rough contour. It also has relatively small openings to facilitate the screening of relatively heavy and/or large particles from the air as it enters the air purifier unit, and is ornamental in appearance. For further filtration at the grille 32 a layer of foamed plastic 33 of about 30 pore specifications is provided. The grille 32 and the layer 33 constitute primary mechanical air filter means. The layer 33 is supported by a hardware cloth partition 35.

For drawing air into the grille 32 and discharging it through the grille 34 a motor M is provvided which is mounted on a motor bracket 20 by resilient mountings 22 to prevent transmission of vibrations from the motor to the housing of the purifier. On the shaft 24 of the motor M, I provide an air circulating fan 26 of the four blade propeller type which rotates in a Venturi opening 30 of a Venturi plate 28.

In general, air enters the front grille 32 of the purifier, is cleaned of smoke, dust, allergy pollens, odors and the like, which results in fresh air discharged from the rear side of the purifier unit through the discharge grille 34. The Venturi opening 30 prevents leakage of air so that all the air must pass through the purifier.

After flowing through the grille 32 the air encounters the filter 33 and thereafter an electrostatic filter comprising positively charged ionizing wires 36 and a negatively charged ionizing plate 38. Thereafter the air passes through a filter pack FP comprising a wire mesh container 40 containing activated charcoal 42.

The intake grille 32, or removable cover element, has several constructional features which will now be described. It is supported in a rectangular frame or band 44 which has a pair of ears 46 adjacent the bottom thereof passing through perforations 48 of a front wall 52 of the housing 10-12-14-16. A threaded stud 50 is riveted to the upper member of the frame 44 and projects rearwardly through an opening 51 in the front wall 52. The stud 50 is adapted to be attached to a connector which is mounted interiorly of the housing. This connector includes an elongated threaded electrically insulating sleeve 54 positioned for sliding movement through an apertured bracket 60 defined on a vertical mounting plate 58. This sleeve 54 has an enlarged knurled head 56 at one end and a retainer washer 62 spaced from the head 56 and adjacent the other end, thereby mounting the connector for limited movement and preventing its accidental dislodgement from a bracket 60. A compression spring 64 is interposed between the knurled head 56 and the bracket 60 for a purpose which will hereinafter appear.

The filter pack FP includes a channel-shaped frame 66 along the bottom and the two vertical sides thereof, and a channel-shaped top member 68 for supporting therein a wire mesh container 40. The filter pack is adapted to be inserted into an opening in the top 12 of the air purifier housing and guided to the position shown in FIG. 1 by pairs of spaced guide flanges 70 on each of the end walls 14 and 16. A screw 72 extends slidably through the top channel 68 and terminates in a knob 74. A spring 76 is interposed between the top channel 68 and the head of the screw 72, and a cover plate 78, laterally enlarged relative to said opening in top 12, is pivotally mounted by means of the screw 72 between channel 68 and knob 74. The channel 68 is provided with four openings 80 as illustrated in FIG. 4.

The wire mesh container 40 of the filter pack FP is an elongated envelope that is subdivided into a plurality of elongated pockets (as seen in FIG. 5) by stapling opposed walls of the envelope together with staples 94 along spaced lines. The stapled portions define oppositely facing depressions or channels 92 which bound the respective pockets in the envelope 40. The stapled opposite walls also constitute longitudinal channel-type reinforcing means extending across the wire mesh container, and the connections at 94 cooperate to define compartments which are open at their upper end for receipt therein of an activated material such as activated charcoal 42. The staples 94 also prevent the side walls of container 40 from undesirable spreading.

The electrostatic filter of my air purifier unit comprises a plurality of spaced upper and lower elongated bar insulators 84 having mounting lugs extending rearwardly through and mounted in rectangular openings 82 of the mounting plate 58 as shown in FIGS. 1 and 2. Each insulator 84 is provided with three forwardly extending projections 86 for supporting the ionizing wires 36 which are actually a single wire starting at the lower left projection 86 in FIG. 2 and threaded zigzag fashion up and over the upper left projection 86, then downwardly and under the next projection at the bottom of the assembly and so on, until terminating at the upper right projection 86, as seen in FIG. 2.

The ionizing plate element for cooperation with the ionizing wires 36 is of special construction as shown particularly in FIG. 3. The plate element comprises parallelly arranged arcuate "plate" electrodes 88 which extend vertically as shown in FIGS. 1 and 2 and which are formed from sheet metal. More specifically, the arcuate electrodes 88 and the mounting portions for the bar insulators 84, including the mounting plate 58, are formed from a single plate or sheet of metal 38, for economy of construction. The arcuate electrodes 88 are stamped, or sheared, from plate 38 in such manner as to leave vertically elongated parallel air slots 90 between each pair of adjacent electrodes. The arcuate electrodes 88 are arranged relative to the ionizing wires 36 as shown in FIG. 3, with equal distances $d$ from the wires to the closest round point on the adjacent convex surfaces of the electrodes 88. The wires 36 thereby form electrodes that coact with the electrodes 88 and provide air gaps between the wires and the electrodes so that the air as indicated by arrows $a$ may flow first around the wires and then through the slots 90.

Referring to FIG. 6 the electric circuit and power supply for the foregoing described parts of my air purifier are shown. A plug 96 is designed for plugging into the usual electrical outlet, and has supply wires 98 and 100 leading therefrom. A safety switch 102 is located in the wire 100 and this switch as shown in FIG. 1 is located adjacent the bottom of the air purifier housing and has a push button 103 that is biased to an upward position and shown in a lowered position in this figure due to the presence of the filter pack FP. This is a normally open switch and accordingly is closed only when the filter pack is in operating position as shown.

A transformer T has a primary coil 104 in circuit with the wires 98 and 100, a return wire 106 being shown for this purpose and an ionizer switch 108 illustrated for controlling it. A heating element HE is connected with the circuit wire 100 and by a return wire 110 through a heating element switch 112 to the wire 98. The heating element is located within the housing of the air purifier unit as shown in FIGS. 1 and 2 in the space between the filter pack FP and the Venturi plate 28.

A wire 100a from supply wire 100, and a pair of return wires 114 and 116 are provided for the motor M, the wire 114 being under control of a fan "Low" switch 118 and the wire 116 under control of a fan "High" switch 120.

The transformer T has a secondary coil 122 of high voltage which supplies alternating current to a rectifier 124 from which direct current flows through a negative wire 126 and a positive wire 130. The negative wire 126 is grounded as indicated at 128 and the positive wire 130 connects to the ionizing wire 36 as shown in the lower left corner of FIG. 2. Since the negative wire 126 is grounded it places in the circuit the entire housing of the air purifier and both the ionizer mounting plate 38 together with its arcuate electrodes 88 and the filter pack FP whereby they are negatively charged as opposed to the wires 36 positively charged.

A shorting switch for preventing residual discharge shock is provided in the form of a leaf spring blade 132 that is adapted to contact between the grounded air purifier housing and a post 134 within the device. The post 134, as shown in FIG. 1, is supported on an insulating post 135 and is connected across the wires 126 and 130 with a capacitor 140 therebetween. The blade 132 under its spring bias would have a normal position illustrated at 132a in FIG. 1. However, when the filter pack FP is in position the lower edge of pack FP engages blade 132 and depresses it to the position shown at 132. When the filter pack, or removable actuator element, is removed the blade springs up to the position indicated at 132b where it effects a contact under spring pressure with the post 134, for insuring good contact. It will be understood that as the removable actuator element, or pack, FP is withdrawn, the switches 102 and 132 open and close respectively sequentially, so as to insure against any shock hazard that may exist by reason of a residual voltage existing in the secondary circuit. Similarly, when inserting pack FP, the switches 132 and 102 open and close respectively sequentially to first prepare the secondary circuit for operation and to then complete, or prepare for completion, the circuit to primary 104.

For controlling the switches 108, 112, 118 and 120, push buttons B¹ to B⁶ inclusive as shown in FIG. 7 are provided projecting outwardly from a switch plate 142 which, as shown in FIG. 2, is mounted on the top wall 12 of the air purifier housing. The push button B¹ controls the circuit of the switches so that only 118 or 120 can be closed and 108 and 112 cannot be closed. The button B⁴ then controls the switch 120 while the button B⁵ controls the switch 118 closing one or the other as selected. The button B⁶ is effective to open either the switch 118 or 120 whichever one is closed. The button B² closes switch 108 and permits closure of either 118 or 120. The button B³ closes both switches 108 and 112 and permits either 118 or 120 to be closed.

Having described the general constructional features of my unit, I will now refer to important characteristics of the various parts thereof. The wires 36 are very fine such as .007″ in diameter to minimize corona and ozone generation. They are spaced about ⅜″ (dimension $d$ in FIG. 3) from the arcuate electrores 88, and charged at a voltage differential in relation thereto of about 6,500 volts as required to produce a satisfactory electrostatic field for the removal of air-borne particles effectively. At the same time the spacing is far enough to minimize corona effects and actual corona discharge between the positive wires 36 and the negative electrodes 88. Corona effects generate ozone, and excessive ozone is detrimental to health because it is toxic. Some ozone in the filtered air however may be beneficial to health. I have found that a combination of flat plates and wires are not satisfactory for effecting electrostatic attraction of particles because there is too great a tendency of electric discharge or sputter between near spots, especially where there are sharp edges. Sharp edges encourage such discharge, whereas rounded edges do not, and an ideal situation would be one in which globes or at least cylinders form the electrodes. High voltage is desirable and globes or cylinders minimize corona, and for a given potential produce the least ozone. On the other hand, and so as to make an inexpensive but effective structure, I provide the electrodes 88 of arcuate cross-section opposed to the wires 36 with each wire equally spaced between two electrodes, and the nearest points as indicated by the arrows $d$ in FIG. 3 being rounded surfaces on electrodes 88 opposing the wires 36. Each electrode 88 is a rib of the stamping that forms the plate 38, and is of concave cross-section. The edges of the electrodes which may be sharp and ragged because of being punched, or sheared, from the plate 38 recede, or are spaced farther away, from the wires 36. The portions of the electrodes 88 which are closest to the wires are, in effect, cylindrical or portions of cylinders and thus present rounded surfaces that result in minimum corona and electric sparking discharge.

In operation, air is first drawn through the fine mesh filter grille 32 and then any minute particles in the air flowing as indicated by the arrows $a$ in FIG. 3 through the ionizing assembly pick up a positive charge when passing by the area of the wires 36, and these particles are then attracted to the negatively charged electrodes 88, when a fraction of a second later they move to or across the negative plate. The distance $d$ is important since it is desirable to have as intense as possible an ionizing field to trap minute particles without at the same time producing excessive ozone content in the room air. All parts of the electrodes 88 and wire 36 must be uniformly equidistant for most efficient results, and the stamping of the electrodes from the plate 38, the arcuate shapes of the electrodes, and the insulator mounts for the wires 36 on the plate cooperate to provide an accurate yet inexpensive structure for effecting this purpose.

Next, as the air moves backward from the negatively charged ionizing plate 38 it encounters the filter pack FP which serves as a mechanical filter, as an electrostatic filter, and also as an odor filter. The quantity of activated charcoal 42 in pack FP traps dust particles by reason of the air passing in a tortuous path therethrough, and since the pack is electrically connected to the housing it carries a negative charge which further attracts minute positively charged particles that may have escaped being attracted by the electrodes 88. The activated charcoal contained inside the filter pack is preferably of small size (about 4 x 6 mesh or 3/16" diameter). When this charcoal is put into the pack it packs together well enough so that all air moving through the pack must travel a tortuous path to get through the charcoal and through the wire mesh that comprises the container 40. It is thus an effective mechanical filter and also an effective electrostatic filter while at the same time the nature of activated charcoal is such that it absorbs odors and thus provides an odor filter. In order to permit sufficient air movement through the entire appliance this filter pack is comparatively large and holds approximately 1¼ quarts of activated charcoal. The filter pack when removed from the housing as shown in FIG. 4 may be opened by swinging the cover plate 78 to the dot-and-dash line position, thus exposing the openings 80 in the top channel 68 which permit removal of the saturated charcoal by merely inverting the filter, and refilling with new charcoal. Refilling is necessary periodically when the charcoal's capacity to remove odors reaches the saturation point. When the charcoal is replaced it is also desirable to wash the wire mesh container 40 to remove foreign particles adhering thereto.

When opening the air purifier unit or when removing anything from the interior thereof it is important to disable the high voltage system to prevent shock hazard. This is accomplished by three safety means comprising the safety switch 102, the shorting switch 132 and the knurled head 56 of the threaded sleeve 54 (see FIG. 1).

When the filter pack FP is lifted out of the purifier and the grille, or removable cover element, 32 is removed, it might be possible for a person to reach inside the grille opening and receive a high voltage shock from one of the high voltage components inside the housing. This danger is prevented by the automatic movement of the shunting switch blade 132 to the position $132^b$ shown in FIG. 1 when the filter pack is removed which shorts out the high voltage direct current ionizing potential by contacting the post 134 which is connected to the positive side of the circuit.

Also the safety switch 102 automatically opens when the weight of the filter pack is removed therefrom, thus opening the input circuit to the transformer T. This prevents continued operation of the transformer and thereby the high voltage ionizing circuit when shorted by the switch blade 132. This also serves as secondary protection in the event the switch blade 132 malfunctions.

A third safety feature is provided by the threaded sleeve 54 and its knob 56 located adjacent the upper end of the filter pack. When the pack FP is removed, the knob 56 remains in its full line position of FIG. 1. However, when it is desired to clean the plates 38, electrodes 88, or wires 36, it is necessary to remove the grille 32. To remove grille 32, the pack FP must first be removed. Then access is had to the knob 56 to rotate same to release stud 50. With stud 50 released, the springs 64 project the knob 54 rearwardly to the dot-dash line position at $56^a$, seen in FIG. 1, and across the path of entry of filter pack FP, so that the filter pack cannot be re-inserted unless grille 32 is connected in assembled position. The knob 56 is inaccessible until the filter pack is removed, and by projecting the position indicated $56^a$ they prevent insertion of the filter pack as long as the grille 32 is removed from the housing. Since the wires 36 and electrodes 88 are subject to the high secondary voltage, it will be evident that these parts must be first protected by the grille 32 before filter pack FP may be inserted to open switch 132 and close switch 102. The knob 56 when projected rearwardly makes it impossible for high voltage to be present on the ionizing wire 36 and plate 38 when the grille 32 is removed for cleaning.

The push button control switch and heating element arrangement disclosed make it possible for the user of my air purifier unit to accomplish several control functions identified as follows:

"*Filter.*"—When the push button $B^1$ is depressed the purifier is in use under a condition of minimum current consumption and for the purpose of mechanical filtration and odor removal only. The air circulating fan is in operation for driving air through the filter parts and odor removal is accomplished by the activated charcoal 42 in the filter pack FP.

"*Summer.*"—When the push button $B^2$ is depressed both the fan motor and the high voltage transformer are electrically energized so that the appliance serves not only as a mechanical filter but also as a high voltage electrostatic precipitator type of filter and of course it also serves to remove odors.

"*Winter.*"—When the button $B^3$ is depressed the appliance serves the same function as when the "Summer" button $B^2$ is depressed except that additionally the heating elements HE are energized. These generate heat which serve the function of preventing chilly drafts as when the appliance is operating in winter months. During the winter, even though room temperature may be normal, when a fan of any kind is operated in the room it tends at first to make a person feel chilly because of the draft. By energizing the heating elements HE this situation is overcome.

Unlike prior air purifiers my purifier is designed for "straight through" operation or, in other words, intake from the front side of the purifier and discharge from the rear side thereof. The appliance may accordingly be arranged to exhaust toward the wall of a room instead of taking air from the front or ends and then exhausting forwardly into the room as is usually done. I find my arrangement proves better as a means for removing smoke and dust. This accomplishes two purposes, first it draws smoky or dusty air directly from the area where persons are more likely to be located in the room and, second, it directs the exhaust stream away from the area where people are likely to be located so that this also serves as a means to reduce drafts when the appliance is operated in winter months.

Tests on devices constructed in accord with the foregoing design have shown the device to have increased smoke and dust filtering capacity compared with competitive portable units while at the same time the ozone generated is less than 0.167 part per million ozone content by weight per 1000 cu. ft. of room air, the stated figure being the design maximum safe level for domestic workers in an enclosed area of operation.

Some changes may be made in the construction and arrangement of the parts of my electrostatic air purifier without departing from the real spirit and purpose of my invention, and it is my intention to cover by my claims any modified forms of structure or use of mechanical equivalents which may reasonably be included within their scope.

I claim as my invention:

1. An electric appliance having a hollow frame means, a high voltage device within said hollow frame means, said frame means defining two openings through which manual contact may be made with said high voltage means, and safety means for preventing inadvertent contact with said high voltage means, said safety means including a first element detachably mounted on said frame means to overlie one of said openings to normally prevent manual access to said high voltage means, mechanical connector means located internally of said frame means for selectively engaging and maintaining said first element on said frame means, a control switch for said high voltage means located internally of said frame means and normally biased to open position, there being access to said connector means and to said control switch only through the other opening, a second element removably carried on said frame means for overlying said other opening to normally prevent access to said mechanical connector means and to said high voltage means, and said second element carrying a part that extends into said frame means to close said control switch only when said second element is properly positioned on said frame means.

2. An electric appliance having a hollow frame means, a high voltage device within said hollow frame means, said frame means defining two openings through which manual contact may be made with said high voltage means, a first element detachably mounted on said frame means to overlie one of said openings to normally prevent manual access to said high voltage means, connector means located internally of said frame means for selectively engaging and maintaining said first element on said frame means, a control switch for said high voltage means located internally of said frame means and normally biased to open position, there being access to said connector means and to said control switch only through the other opening, a second element removably carried on said frame means for overlying said other opening to normally prevent access to said connector means and to said high voltage means, and said second element carrying a part that extends into said frame means to close said control switch only when said second element is properly positioned on said frame means, and resilient means biasing said connector means, when disconnected from said first element, toward a position to prevent closure of said control switch by said second element.

3. An air purifier comprising, in combination, casing means, a high voltage electrostatic air filter in said casing means, a control switch in said casing means normally biased open for controlling energization of said electrostatic air filter, a ground switch in said casing means normally biased toward a grounding position for grounding said electrostatic air filter, a removable actuator element carried by said casing means and selectively removable therefrom for permitting manual access to said electrostatic air filter, said removable actuator element operating to engage and move said grounding switch away from grounding position and to engage and close said control switch only when said removable actuator element is properly positioned on said casing means so as to deny manual access to said electrostatic air filter, a removable grid on said casing means which when removed permits access to said electrostatic air filter, and connector means for said grid within said casing means and accessible for operation thereof only when said actuator element is removed from the casing means.

4. An air purirfier comprising casing means, a high voltage electrostatic air filter in said casing means, a control switch in said casing means normally biased open for controlling energization of said electrostatic air filter, a ground switch in said casing means normally biased toward a grounding position for grounding said electrostatic air filter, a mechanical air filter element carried by said casing means and selectively removable for permitting cleaning thereof, said mechanical air filter, when removed, permitting manual access to said electrostatic air filter and operating to engage and move said grounding switch away from grounding position and to engage and close said control switch only when properly positioned in said casing means to act in its filtering capacity at which time it denies manual access to said electrostatic air filter, a removable grid on said casing means which when removed also permits access to said electrostatic air filter, and connector means for said grid within said casing means and accessible for operation thereof only when said mechanical air filter is removed from the casing means.

5. An electrostatic ionizing assembly for use in air treatment apparatus and the like, said electrostatic ionizing assembly comprising, in combination, a metal plate element one side of which is arranged to face forward relative to the direction of flow of air relative thereto, said plate element including means providing a plurality of spaced, substantially parallel, elongated plate conductors of arcuate shape with their convex surfaces facing forwardly and transverse to the direction of air flow relative to said plate element, said plate conductors being located in a first plane that extends rearwardly from said forward side of the plate, said plate element and spaced plate conductors thereon also defining a plurality of elongated spaced unobstructed flow apertures through which the air to be treated is cause to flow, a plurality of insulating projections on said metal plate element extending forwardly of said forward side of the plate element and arranged in a pair of spaced rows that run transverse to said parallel plate conductors, an elongated wire conductor and ionizer element carried on said insulating projections and being disposed in a second plane spaced forwardly of and parallel to said first plane, said wire conductor being sinuated to provide a plurality of spaced substantially parallel elongated conductor segments that are each located in register centrally of each said elongated flow aperture and spaced equidistant from a pair of rearwardly adjacent plate conductors.

6. An air purifier comprising, in combination, casing means, high voltage electrostatic air filter means in said casing means, said electrostatic air filter means including ionizing elements and plate elements upon which deposit is to be effected, a control switch in the casing means normally biased open for controlling energization of said electrostatic air filter, a grounding switch in the casing means normally biased toward a grounding position for grounding said electrostatic air filter, said casing means defining a recess adapted to receive an actuator element thereinto, said control switch and grounding switch having at least portions thereof extending into the said recess and positioned to be engaged by an actuator element, a removable actuator element carried in said recess in said casing means and being selectively removable for thereafter permitting manual access to said electrostatic air filter through said recess, said removable actuator element carrying a filter thereon and being electrically conductive therewith, said actuator element operating both to engage and move said grounding switch away from grounding position and to close said control switch only when said removable actuator element is properly positioned in said recess in said casing means and also operating so as to deny manual access to said electrostatic air filter, and means including the portion of the grounding switch engaged by the actuator element for maintaining the filter element and the plate elements of the electrostatic air filter means at the same electrical potential.

7. An air purifier comprising, in combination, casing means, high voltage electrostatic air filter means in said casing means, said electrostatic air filter means including ionizing elements and plate elements upon which deposit is to be effected, a control switch in the casing means normally biased open for controlling energization of said electrostatic air filter, a grounding switch in the casing means normally biased toward a grounding position for grounding said electrostatic air filter, said casing means defining a recess adapted to receive an actuator element thereinto, said control switch and grounding switch having at least portions thereof extending into the said recess and positioned to be engaged by an actuator element, a removable actuator element including a metallic mesh envelope carried in said recess in said casing means and being selectively removable for thereafter permitting manual access to said electrostatic air filter through said recess, said removable actuator element with metallic mesh envelope providing an air filter that may be rendered electrically conductive through said metallic mesh envelope, said actuator element operating both to engage and move said grounding switch away from grounding position and to close said control switch only when said removable actuator element is properly positioned on said casing means and also operating so as to deny manual access to said electrostatic air filter, means including the portion of the grounding switch engaged by the actuator element for maintaining the metallic mesh envelope and the plate elements of the electrostatic air filter means at the same electrical potential, and said actuator element operating sequentially to first open the control switch and then permit the grounding switch to move to grounding position when the actuator element is removed from said casing means.

8. A filter element comprising, in combination, peripheral frame means, an open-ended metallic mesh container mounted on said frame means and providing normally spaced container side walls extending across the area surrounded by said peripheral frame means, means clamping opposed portions of the side walls of the container against each other along a plurality of substantially parallel lines extending transversely to the plane of the open end of the container to define a plurality of discrete elongated recesses in said container, there being openings in one side of the peripheral frame in register with said plurality of elongated recesses, a large plurality of fragments of activated charcoal filling each of said elongated recesses, and an elongated cover element pivoted intermediate its ends on said frame means for selectively opening or closing said openings in the one side of the peripheral frame to permit of removal and replenishing the activated charcoal fragments from and to the elongated recesses as desired.

References Cited by the Examiner
UNITED STATES PATENTS

| | | | |
|---|---|---|---|
| 1,400,795 | 12/21 | Bradley | 55—130 |
| 1,708,065 | 4/29 | Jordahl et al. | 55—48 X |
| 1,843,446 | 2/32 | Drager | 55—485 |
| 1,883,715 | 10/32 | Greene | 55—515 X |
| 2,351,815 | 6/44 | Jensen | 220—33 X |
| 2,415,621 | 2/47 | Arnhym | 55—267 X |
| 2,606,686 | 8/52 | Barranco | 220—33 X |
| 2,628,083 | 2/53 | Rense | 55—267 X |
| 2,658,583 | 11/53 | Fitzgerald | 55—518 |
| 2,686,007 | 8/54 | Hurtig et al. | 220—33 X |
| 2,825,102 | 3/58 | Hicks et al. | 55—135 X |
| 2,838,130 | 6/58 | Lemmon | 55—329 X |
| 2,847,082 | 8/58 | Roos | 55—132 |
| 2,871,977 | 2/59 | Kling | 55—519 X |
| 2,873,000 | 2/59 | Elam | 55—138 |
| 2,933,151 | 4/60 | Kurtz | 55—124 X |
| 2,966,960 | 1/61 | Rochlin | 55—502 |
| 2,979,158 | 4/61 | Vlier | 55—126 X |
| 2,987,137 | 6/61 | Brixius et al. | 55—138 |
| 2,990,911 | 7/61 | Lippincott | 55—139 X |
| 2,991,843 | 7/61 | Bell | 55—509 |
| 3,028,715 | 4/62 | Nodolf | 55—138 |
| 3,053,028 | 9/62 | Kayko | 55—131 X |
| 3,073,094 | 1/63 | Landgraf et al. | 55—131 |
| 3,108,865 | 10/63 | Berly | 55—131 |

HARRY B. THORNTON, *Primary Examiner.*

GEORGE D. MITCHELL, HERBERT L. MARTIN, ROBERT F. BURNETT, *Examiners.*